US008810871B2

(12) United States Patent
Tashiro et al.

(10) Patent No.: US 8,810,871 B2
(45) Date of Patent: Aug. 19, 2014

(54) IMAGE READING APPARATUS AND CLEANING SHEET

(71) Applicants: Noriharu Tashiro, Nagoya (JP); Masahiko Nagai, Nagoya (JP); Tomoyasu Niizeki, Ichinomiya (JP); Kei Kawase, Nagoya (JP); Junnosuke Matsuda, Nagoya (JP)

(72) Inventors: Noriharu Tashiro, Nagoya (JP); Masahiko Nagai, Nagoya (JP); Tomoyasu Niizeki, Ichinomiya (JP); Kei Kawase, Nagoya (JP); Junnosuke Matsuda, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 13/788,413

(22) Filed: Mar. 7, 2013

(65) Prior Publication Data

US 2013/0250374 A1    Sep. 26, 2013

(30) Foreign Application Priority Data

Mar. 21, 2012   (JP) ................................. 2012-063601

(51) Int. Cl.
   *H04N 1/04*    (2006.01)
   *H04N 1/00*    (2006.01)
   *B08B 1/00*    (2006.01)

(52) U.S. Cl.
   CPC ....... *H04N 1/00909* (2013.01); *H04N 1/00045* (2013.01); *H04N 2201/0081* (2013.01); *H04N 2/00477* (2013.01); *H04N 1/00013* (2013.01); *B08B 1/00* (2013.01); *H04N 1/00031* (2013.01)
   USPC ............ 358/474; 358/497; 358/482; 399/327

(58) Field of Classification Search
   CPC ..... H04N 1/002; H04N 1/0002; H04N 1/486; H04N 1/4076; H04N 1/3871; H04N 1/62; G06F 3/041
   USPC ......... 358/474, 463, 443, 486, 497, 496, 483, 358/494; 399/34, 327, 71
   See application file for complete search history.

(56) References Cited

U.S. PATENT DOCUMENTS

| | | | | |
|---|---|---|---|---|
| 5,539,508 | A * | 7/1996 | Piotrowski et al. | 399/170 |
| 6,271,872 | B1 * | 8/2001 | Nagata | 347/171 |
| 6,511,141 | B1 * | 1/2003 | Hasegawa et al. | 347/3 |
| 6,788,902 | B2 * | 9/2004 | Funahashi | 399/8 |
| 6,845,225 | B2 * | 1/2005 | Toyoda et al. | 399/327 |

(Continued)

FOREIGN PATENT DOCUMENTS

| | | |
|---|---|---|
| JP | 50-152739 A | 12/1975 |
| JP | 01-209475 A | 8/1989 |

(Continued)

*Primary Examiner* — Negussie Worku
(74) *Attorney, Agent, or Firm* — Fox Rothschild LLP

(57) ABSTRACT

An image reading apparatus including a feed mechanism configured to feed a sheet member; a scanner including a reading portion and being configured to read an image on a surface of the sheet member in synchronism with the feeding of the sheet member by the feed mechanism; a cleaning sheet comprising a single sheet including a cleaning portion configured to clean the reading portion, and a reference portion configured to be used in evaluating contamination of the reading portion; an evaluator configured to evaluate the contamination of the reading portion based on read data pertaining to an image of the reference portion of the cleaning sheet read by the scanner; and a controller configured to control the feed mechanism to execute a cleaning operation in which the cleaning sheet is fed so that the cleaning portion cleans the reading portion based on the evaluation of the evaluator.

5 Claims, 13 Drawing Sheets

(56) References Cited

U.S. PATENT DOCUMENTS

| | | | |
|---|---|---|---|
| 7,177,578 B2* | 2/2007 | Nakamura et al. | 399/327 |
| 7,352,495 B2* | 4/2008 | Sugeta | 358/474 |
| 7,438,288 B2* | 10/2008 | Nishiberi et al. | 271/256 |
| 7,715,615 B2* | 5/2010 | Van Nice et al. | 382/149 |
| 7,783,239 B2* | 8/2010 | Yamanaka et al. | 399/327 |
| 7,899,380 B2* | 3/2011 | Suzuki et al. | 399/327 |
| 7,933,543 B2* | 4/2011 | Yoshioka et al. | 399/327 |
| 8,123,421 B2* | 2/2012 | Izuchi | 400/629 |
| 8,174,732 B2* | 5/2012 | Oteki | 358/3.26 |
| 8,606,157 B2* | 12/2013 | Yoshioka et al. | 399/327 |
| 2005/0212892 A1* | 9/2005 | Iso | 347/179 |

FOREIGN PATENT DOCUMENTS

| | | |
|---|---|---|
| JP | 03-117962 A | 5/1991 |
| JP | 11-243468 A | 9/1999 |
| JP | 11-249492 A | 9/1999 |

\* cited by examiner

FIG.13A
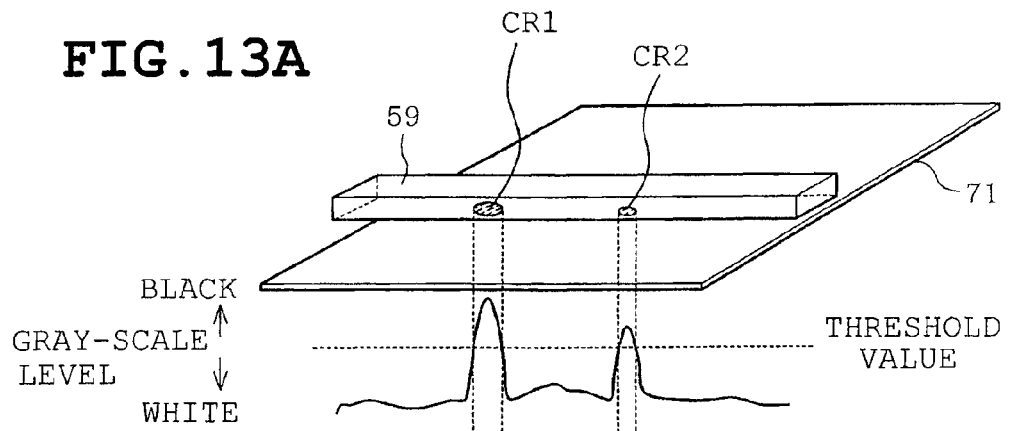
FIG.13B
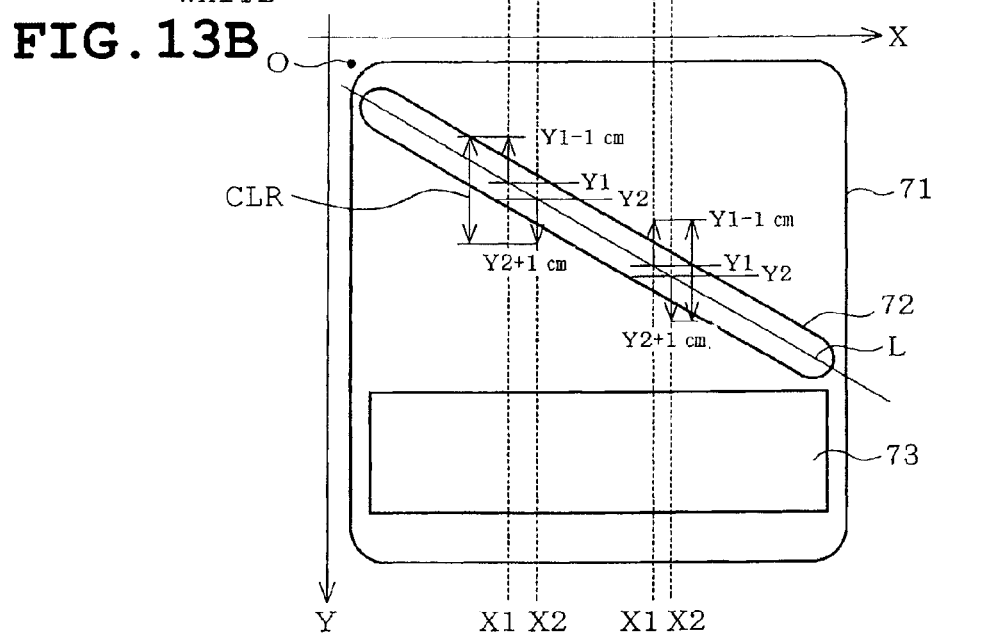
FIG.13C

IMAGE READING APPARATUS AND CLEANING SHEET

CROSS-REFERENCE TO RELATED APPLICATION

This application is based upon and claims the benefit of priority from the prior Japanese Patent Application 2012-063601, filed on, Mar. 21, 2012, the entire contents of which are incorporated herein by reference.

FIELD

The present disclosure relates to an image reading apparatus provided with a scanner that reads images on the surface of a sheet member fed by a feed mechanism and a cleaning sheet used for cleaning a reading portion of the scanner.

BACKGROUND

Image reading apparatus such as a copier, facsimile, and image scanner are typically provided with a feed mechanism that feeds sheet material such as a sheet of paper in the forward and rearward direction which may also be referred hereinafter as the Y direction. The image reading apparatus is further typically provided with a scanner comprising a contact image sensor known as CIS that extend in the left and right direction which may also be referred hereinafter as the X direction. The image reading apparatus configured as described above captures the image on the surface of the sheet material by scanning the surface while the sheet material is fed in the Y direction by the feed mechanism.

The problem encountered in such image reading apparatus is contamination of the contact glass provided at the read head, in other words, the reading portion of the scanner. Contamination of the read head degrades the quality of the captured image which may be observed as a substantially straight black line(s). In order to remove such contamination, the user was required to clean the reading head. One solution to such inconvenience is a cleaning sheet fully covered on one side with a brush-like fabric. The cleaning sheet is fed passed the scanner by the feed mechanism and brushes off the contamination on the read head on its way passed the scanner.

The above described cleaning sheet however, merely cleaned the entire read head evenly while being fed, regardless of the location and the level of contamination in the read head of the scanner, and thus, bore a risk of residual contamination due to insufficient cleaning.

SUMMARY

Various exemplary embodiments of the general principles herein may provide an image reading apparatus capable of performing sufficient and efficient cleaning of the read head of the scanner through the use of a cleaning sheet. Exemplary embodiments herein may also provide a cleaning sheet capable of performing sufficient and efficient cleaning of the read head of the scanner.

In one embodiment, an image reading apparatus is disclosed. The image reading apparatus includes a feed mechanism configured to feed a sheet member; a scanner including a reading portion and being configured to read an image on a surface of the sheet member in synchronism with the feeding of the sheet member by the feed mechanism; a cleaning sheet comprising a single sheet including a cleaning portion configured to clean the reading portion of the scanner, and a reference portion configured to be used in evaluating contamination of the reading portion; an evaluator configured to evaluate the contamination of the reading portion based on read data pertaining to an image of the reference portion of the cleaning sheet read by the scanner; and a controller configured to control the feed mechanism to execute a cleaning operation in which the cleaning sheet is fed so that the cleaning portion cleans the reading portion based on the evaluation of the evaluator.

In one embodiment, a cleaning sheet is disclosed for use with a cleaning apparatus including a feed mechanism configured to feed a sheet member, and a scanner including a reading portion and being configured to read an image on a surface of the sheet member while feeding the sheet member by the feed mechanism. The cleaning sheet is configured to clean the reading portion of the scanner. The cleaning sheet includes a cleaning portion configured to clean the reading portion; and a reference portion being provided in a single sheet with the cleaning portion and being configured to evaluate contamination of the reading portion.

BRIEF DESCRIPTION OF THE DRAWINGS

FIG. 13A illustrates an example of contamination located on a read head of a scanner.

FIG. 13B is a chart indicating the level of read gray scale.

FIG. 13C indicates the range of reciprocating movement of a cleaning sheet.

DETAILED DESCRIPTION

(1) First Embodiment

A first embodiment of the disclosure is described with reference to FIGS. 1 to 13C. An image reading apparatus 1 of the first embodiment is configured to include a cutting apparatus 1' that cuts sheet materials such as a sheet of paper.

Figure 1:
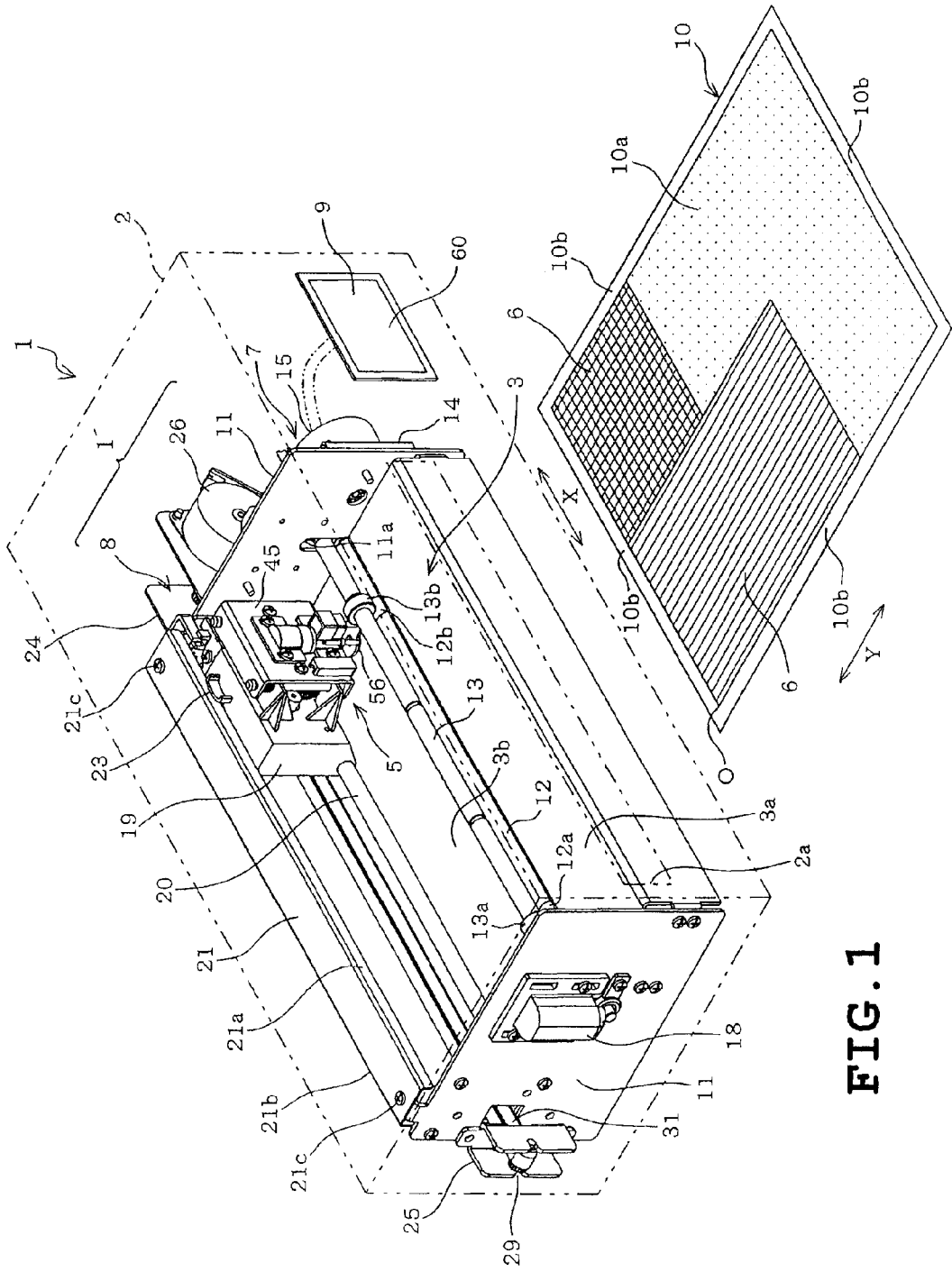
FIG. 1 illustrates a first embodiment and is a perspective view of the inner structure of an image reading apparatus.
Figure 2:
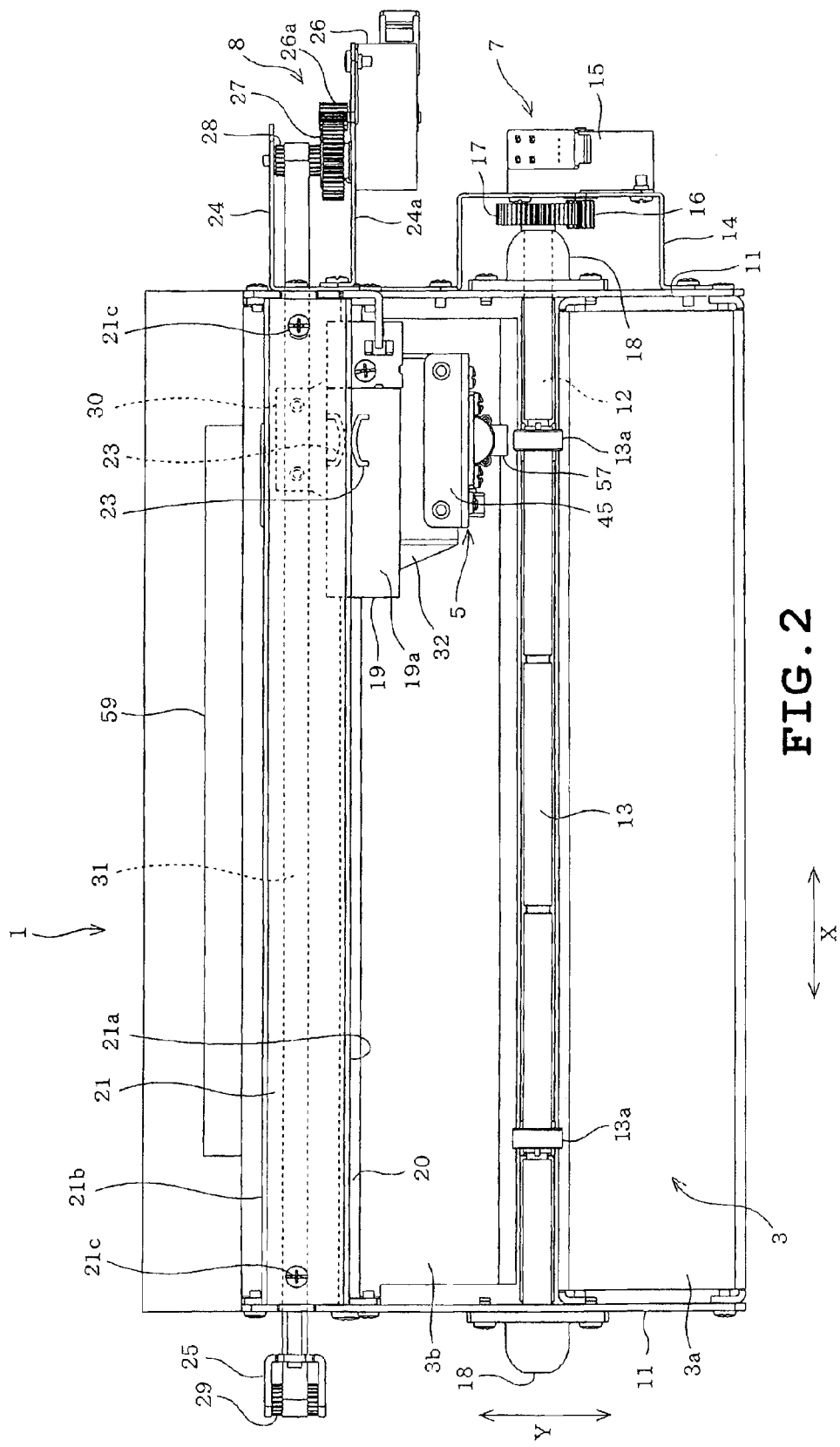
FIG. 2 is a plan view of the inner structure of the image reading apparatus.
Figure 4:
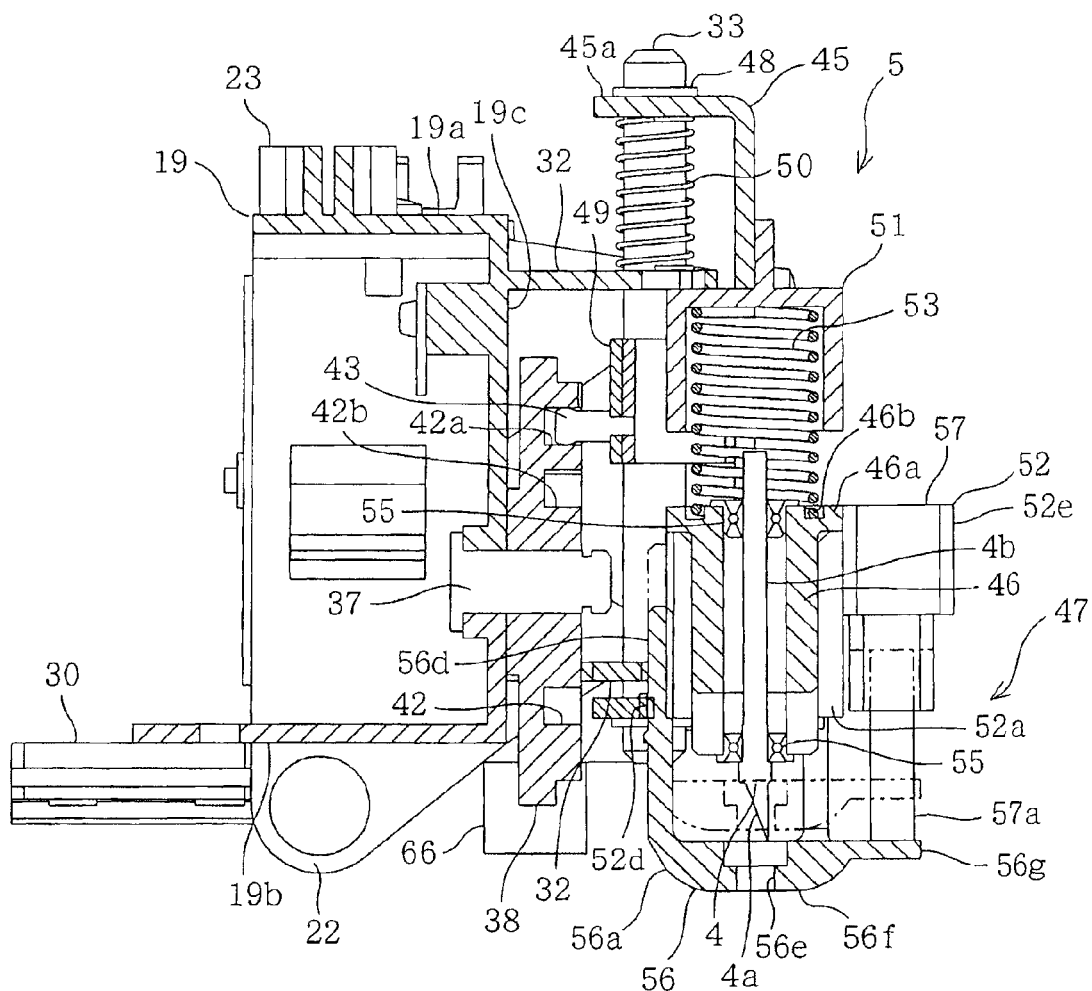
FIG. 4 is a cross sectional view of the cutter holder when a cutter is raised.

Referring to FIGS. 1 and 2, the image reading apparatus 1 including the cutting apparatus 1' is provided with a main cover 2 shown in FIG. 1, a platen 3 disposed inside the main cover 2, and a cutter holder 5 holding a cutter 4 shown in FIG. 4. As further shown in FIG. 2, the image reading apparatus 1 is provided with a scanner 59 possessing an image reading feature. Scanner 59 will be later described in detail.

Referring back to FIG. 1, the main cover 2 is shaped like a rectangular box and on the front face of the main cover 2, a laterally elongate opening 2a is formed. Through the opening 2a, a holding sheet 10 holding a workpiece 6 such as paper may be placed on the upper surface of the platen 3. As also shown in FIG. 2, the imaging reading apparatus 1 is further provided with a feed mechanism 7 and a cutter transfer mechanism 8. The feed mechanism 7 feeds the sheet material in the forward and rearward direction also referred to as the Y direction. The cutter transfer mechanism 8 transfers the cutter holder 5 in the left and right direction also referred to as the X direction.

Still referring to FIG. 1, on the right side of the front face of the main cover 2, a display 9 is provided which comprises a full color liquid crystal display. Provided further on the right side of the front face of the main cover 2 is a plurality of control switches 65 only shown in FIG. 8 which is controlled by the user for providing various instructions and making selections and inputs. Display 9 serves a display unit that presents images of patterns and messages addressed to the user. The user may select a given pattern from those presented on the display 9 and specify various parameters as well as input instructions through the operation of the control switches. As also indicated in FIGS. 8 and 11A to 11D, a touch panel 60 is provided on the surface of the display 9. As will be later described in detail, the touch panel 60 serves as a switch controller for causing a mode switching between a normal mode and a cleaning mode.

Referring to FIGS. 1 and 2, the platen 3 receives the underside of holding sheet 10 when cutting the workpiece 6 and comprises a pair of front plate 3a and a rear plate 3b. The upper surface of the platen 3 is level and the holding sheet 10 holding the workpiece 6 is placed on the platen 3. As shown in FIG. 1, the holding sheet 10 is configured as a rectangular sheet made of synthetic resin which is slightly elongated in the front and rear direction. The upper surface of the holding sheet 10 includes an adhesive portion 10a which is formed by applying an adhesive on the area of the upper surface surrounded by peripheral edge portion 10b. The user may stick or attach the workpiece 6 on the adhesive portion 10a to allow the workpiece 6 to be held by the holding sheet 10. The adhesive force of the adhesive portion 10a is controlled to a relatively weak level to allow the workpiece 6 to peel easily. The holding sheet 10 is assigned an X-Y coordinate system in which the origin O is located on the rear left corner of the adhesive portion 10a. The X-Y coordinate system serves as the basis for specifying the later described cut line data.

The feed mechanism 7 transfers the holding sheet 10 and the later described cleaning sheet 71 shown, for example, in FIG. 9 in the forward and rear direction, in other words, the Y-direction across the upper surface of the platen 3 and is configured as described below.

Referring to FIGS. 1 and 2, inside the main cover 2, left and right sidewalls 11 are provided so as to be located on the left and right sides of the platen 3. The drive roller 12 and the pinch roller 13 that extend across the left and right sidewalls 11 so as to be located in the clearance between the front plate 3a and the rear plate 3b of the platen 3. The pinch roller 13 is disposed above the drive roller 12.

Referring to FIG. 2, on the outer surface of the right sidewall 11, a U-shaped mount plate 14 is attached. On the outer side of the mount plate 14 as viewed in FIG. 2, a Y-axis motor 15 is mounted so as to be oriented in the leftward direction. The Y-axis motor comprises, for instance, a stepping motor. The rotary shaft of the Y-axis motor 15 penetrates leftward through the mount plate 14 as viewed in FIG. 2 and at the end of the rotary shaft, a drive gear 16 is attached which has a relatively small diameter. The drive gear 16 is meshed with a follower gear 17 having a relatively large diameter provided on the right end of the drive roller 12. Thus, the forward/reverse rotation of the Y-axis motor 15 drives the drive roller 12 in rotation in the forward and reverse directions.

Referring back to FIG. 1, on both the left and right sidewalls 11, guide grooves 11a extending in the up and down direction are formed though only one is shown on the right sidewall 11. The guide grooves 11a allow the pinch roller 13 to be moved slightly in the upward and the downward directions. On the outer surface of each of the left and right sidewalls 11, a spring container 18 is provided which contains a compression coil spring not shown. The pinch roller 13 disposed above the drive roller 12 is biased downward toward the drive roller 12 by the compression coil springs inside the left and right spring containers 18. Near the left and right side ends of the pinch roller 13, depressors 13a and 13b are provided that have outer diameters slightly larger than those of other portions of the pinch roller 13. The drive roller 12 similarly has depressors 12a and 12b having relatively large diameters at locations corresponding to the depressors 13a and 13b.

The depressors 12a and 12b of the drive roller 12 and the depressors 13a and 13b of the pinch roller 13 hold the left and right side edge portions 10b of the holding sheet 10 or the later described cleaning sheet 71 therebetween. The holding sheet 10 or the cleaning sheet 71 is moved in the forward and rearward direction in this state by the drive roller 12 being driven in rotation.

The cutter transfer mechanism 8 transfers the carriage 19 for holding the cutter holder 5 in the left and right direction also referred to as the X direction. More specifically, between the rear end portions of the left and right sidewalls 11, a guide shaft 20 and a guide frame 21 are disposed so as to extend in the left and right direction as can be seen in FIGS. 1 and 2. The guide shaft 20 is located immediately above the platen 3 and extends through the lower portion of the carriage 19, that is, through a later described through hole 22 shown in FIGS. 3 to 5. The carriage will be later described in detail.

The guide frame 21 has a U-shaped cross section in which a front edge 21a and a rear edge 21b thereof is bent downward. The front edge 21a runs parallel to the guide shaft 20. The front edge 21a of the guide frame 21 guides the later described guide subjects 23 provided on the upper portion of the carriage 19. The guide frame 21 is secured on the upper ends of the sidewalls 11 by screws 21c.

Referring to FIGS. 1 and 2, mount frame 24 is attached to the outer rear side portion of the right sidewall 11, whereas an auxiliary frame 25 is attached to the left sidewall 11. The mount plate 24 is provided with a timing pulley 28, the axial direction of which extends in the forward and rearward direction. Similarly, auxiliary frame 25 is provided with a timing pulley 29, the axial direction which extends in the forward and rearward direction. The timing pulley 28 and 29 are wound with an endless timing belt 31. As can be seen in FIG. 2, The timing belt 31 is connected to the rear end of the mount portion 30 of the carriage 19.

Still referring to FIGS. 1 and 2, on a mount piece 24a located on the front side of the mount frame 24, an X-axis motor 26 is provided so as to be oriented rearward. The X-axis motor 26 comprises a stepping motor for example. As can be seen in FIG. 2, the rotary shaft of the X-axis motor 26 extends rearward through the mount piece 24a and has drive gear 26a having a relatively small diameter attached to its rear end. The drive gear 26a meshes with a follower gear 27 having relatively large diameter and being provided coaxially with the timing pulley 28. Thus, when the X-axis motor 26 is driven in rotation in the forward and reverse directions, the rotational drive is transmitted to the timing belt 31 by way of the follower gear 27 and the pulley 28. As a result, the carriage 19 as well as the cutter holder 5 are transferred in the left and right direction.

The cutter holder 5 is disposed on the front side of the carriage 19 and is supported by the carriage 19 so as to be movable in the up and down direction, also referred to as the Z direction. The structures of the carriage 19 and the cutter holder 5 will be described in detail with reference to FIGS. 3 to 7.

Figure 3:
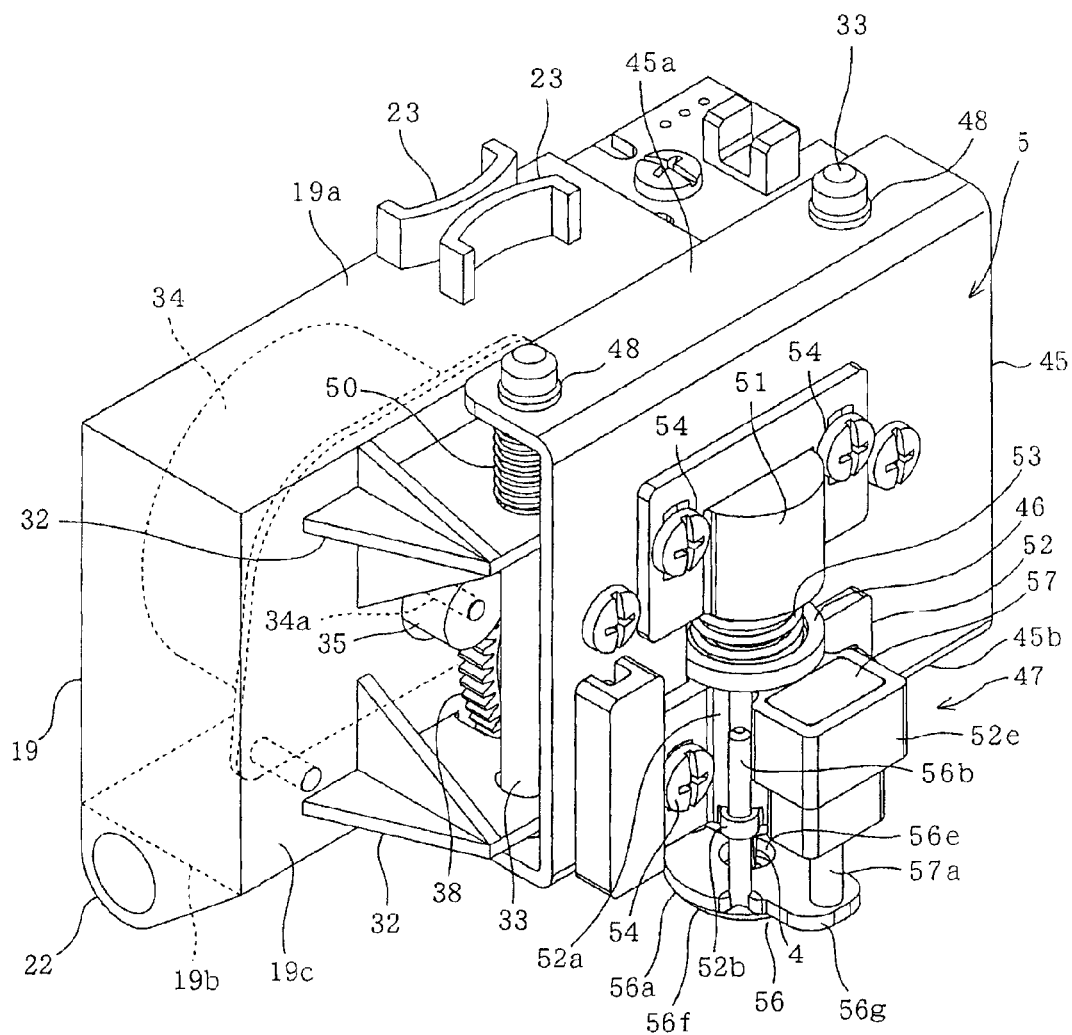
FIG. 3 is a perspective view of a cutter holder.
Figure 5:
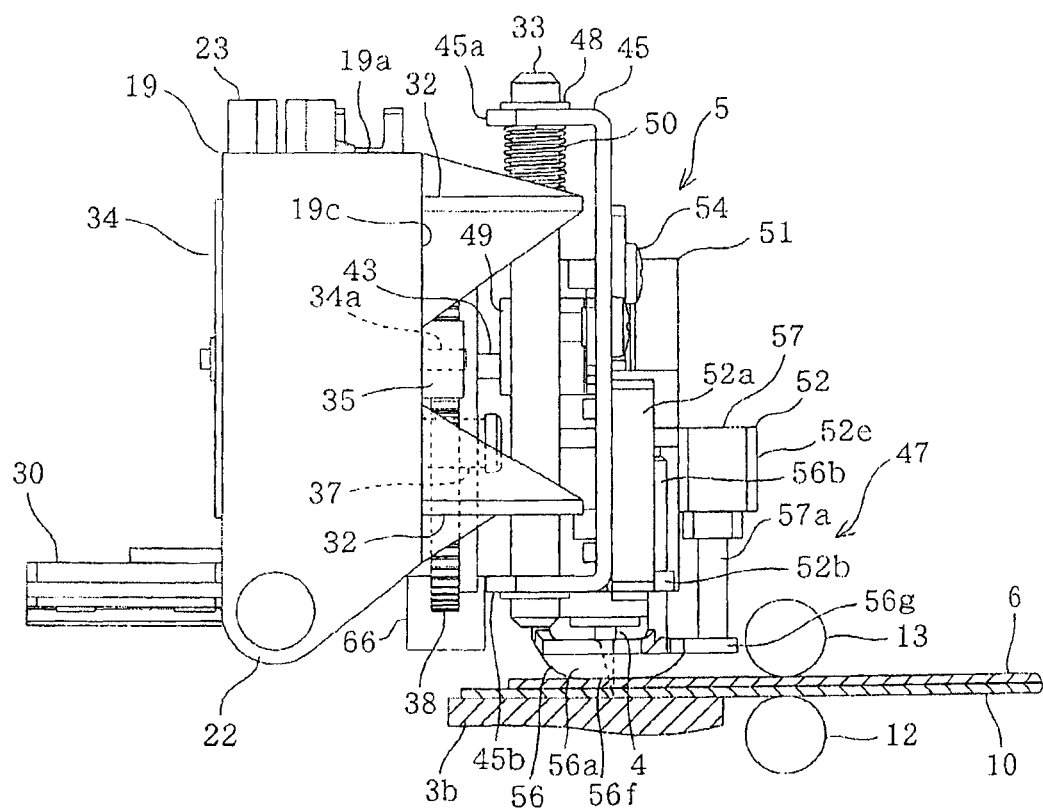
FIG. 5 is a side view of the cutter holder portion when the cutter is lowered for cutting.

Referring to FIGS. 3 and 4, the carriage 19 is configured substantially in the form a rectangular box which is oriented such that its opening faces rearward. On an upper wall 19a of the carriage 19, a pair of front and rear guide subjects 23 are provided so as to be structurally integral with the upper wall 19a. Each of the guide subjects 23 protrudes upward and is shaped like an arc in plan view. The guide subjects 23 are disposed symmetrically so as to clutch the front edge 18a of the guide frame 21 from the front and rear side. On the bottom end portion 19b of the carriage 19, a pair of left and right protrusions are formed so as to protrude further below the bottom end portion 19b of the carriage 19. The pair of left and right protrusions are provided with a pair of left and right through holes 22 for insertion of the guide shaft 20. FIGS. 3 and 4 only show the left side through hole 22. Referring now to FIGS. 4 and 5, the bottom wall 19b of the carriage 19 is further provided with a rearwardly protruding mount portion 30 configured to be connected to the timing belt 31. The carriage 19 is thus, supported slidably in the left and right direction by the guide shaft 20 inserted into the through hole 22. Because the guide subjects 23 of the carriage 19 clutches the guide frame 21, the carriage 19 is inhibited from pivoting around the guide shaft 20.

Referring to FIGS. 3 to 5, a pair of up and down support portions 32 extends horizontally forward from a front wall 19c of the carriage 19. Each of the support portions 32 is laterally elongate plate material. The carriage 19 is further provided with a pair of left and right support shafts 33 that penetrates through both the upper and the lower support portion 32 so as to be movable in the up and down direction. The carriage 19 further contains a Z-axis motor 34, comprising a stepping motor for example, so as to be installed from the rear side.

As can be seen in FIGS. 3 and 5, rotary shaft 34a of the Z axis motor 34 penetrates through the front wall 19c of the carriage 19 and has a gear 35 having a relatively small diameter attached to its terminating end. As further shown in FIG. 4, a gear shaft 37 extends in the forward and rearward direction so as to penetrate through a portion slightly below the center of the front wall 19c of the carriage 19. The gear shaft 37 is provided with a gear 38 having a relatively large diameter and that meshes with the gear 35 in front of the front wall 19c. The gear 38 is secured on the front end of the gear shaft 37 by a stop ring not shown.

Figure 6:
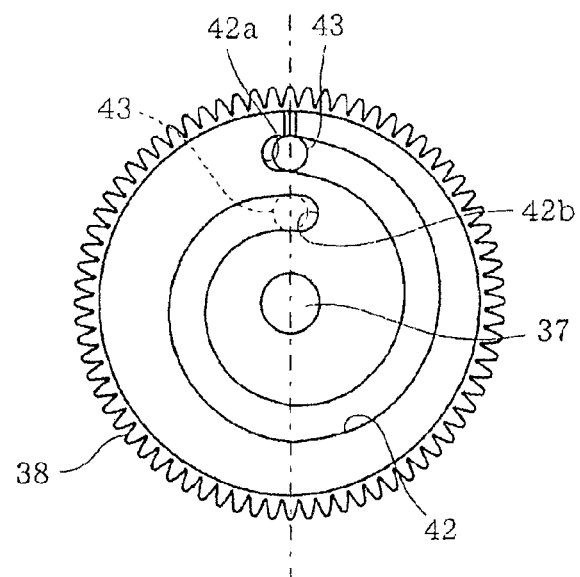
FIG. 6 is a front view showing the shape of a swirl groove of a gear.

Referring now to FIG. 6, on the gear 38, a swirl groove 42 is formed which serves as a cam groove. The swirl groove 42 is rightwardly wound and approaches the center of the gear 38 as it runs from a first end 42a to a second end 42b. As shown in FIG. 4, the swirl groove 42 engages with an engagement pin 43 that is moved up and down with the cutter holder 5. The structure of the engagement pin 43 will be later described. When the Z-axis motor 34 is driven in the forward and reverse directions, the gear 38 rotates by way of the gear 35. The rotation of the gear 38 causes the engagement pint 43 engaging with the swirl groove 42 to be moved up and down. As a result, the cutter holder 5 is lifted or lowered with the support shafts 33. More specifically, the cutter holder 5 is moved between a raised position in which the engagement pin 43 is located at the first end 42a of the swirl groove 42 as shown in FIGS. 4 and 6 and the lowered position in which the engagement pin 43 is located at the second end 42b.

As shown in FIGS. 3 to 5, the cutter holder 5 is provided with a holder body 45 provided at the pair of left and right support shafts 33, and a movable tube 46 provided with a cutter 4 and being held so as to be movable up and down by the holder body 45. The cutter holder 5 is further provided with a presser device 47 for pressing the workpiece 6. The holder body 45 has an upper end portion 45a and a lower end portion 45b that are bent rearward to exhibit a generally U shape. The upper end portion 45a and the lower end portion 45b of the holder body 45 are secured by stop rings 48 on the upper and lower end portions of the support shafts 33 so as to be unmovable with respect to the support shafts 33. As can be seen in FIGS. 4 and 5, on the vertical mid portion of the right side support shaft 33, a connecting member 49 is attached. The engagement pin 43 is provided on the connecting member 49 so as to be oriented rearward. The holder body 45, support shafts 33, the engagement pin 43, and the connecting member 49 are unitized in the above described manner to allow the cutter holder 5 to be moved up and down with the engagement pin 43. Each of the support shafts 33 has a compression coil spring 50 serving as a biasing member wound on it at a portion located between the upper surface of the upper support portion 32 and the underside of the upper end portion 45a of the holder body 45. The biasing force exerted by the compression coil spring 50 biases the entire cutter holder 5 upward with respect to the components in the carriage 19 side.

Referring to FIG. 3, on the mid portion of the holder body 45, mount members 51 and 52 for mounting components such as the movable tube 46 and the presser device 47 are secured by multiple screws 54. As shown in FIGS. 4 and 5, the lower mount member 52 is provided with a sleeve 52a that movably supports the movable tube 46. As can be seen in FIG. 4, the movable tube 46 is cylindrical in form and is radially dimensioned so as to be in sliding contact with the inner peripheral surface of the sleeve 52a. On the upper end of the movable tube 46, a flange 46a projecting radially outward is provided so as to be supported by the upper end of the sleeve 52a. The upper end surface of the flange 46a is provided with a spring receiving portion 46b. As partially shown in FIG. 3, between upper mount member 51 and the spring receiving portion 46b of the movable tube 46, a compression coil spring 53 is provided. The compression coil spring 53 biases the movable tube 46 and consequently the cutter 4 downward toward the workpiece 6. The compression coil spring 53, on the other hand, allows the upward movement of the movable tube 46 against the biasing force when an upward force is exerted on the cutter 4 from the workpiece 6 side.

Figure 7:
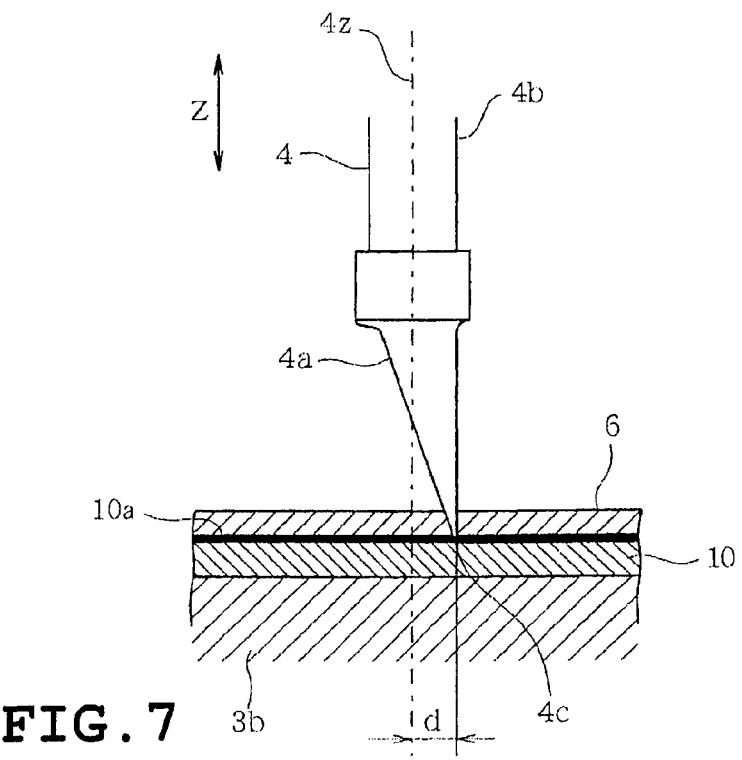
FIG. 7 is an enlarged side view of the tip of the cutter during cutting.

Referring now to FIGS. 4 to 7, the movable tube 46 is arranged to allow the cutter 4 extending its axial direction to pass through it. More specifically, the cutter 4 comprises a cutter shaft 4b in the shape of round bar being longer than the movable tube 46, and a blade 4a formed at the lower end of the cutter shaft 4b that are structurally integral. As can be seen in FIG. 7, the blade 4a is nearly triangular and the lowermost tip 4c is eccentric by distance d from the central axis 4z of cutter shaft 4b. As shown in FIG. 4, the cutter 4 is held rotatably about the central axis 4z shown in FIG. 7 that extends in the up and down direction also referred to as the Z direction by bearings 55 disposed on the upper and lower ends of the movable tube 46 interior. The cutter 4 is thus, configured such that the tip 4c depresses the surface also referred to as the XY plane of the workpiece 6 from the Z direction orthogonal to the XY plane. Further, as can be seen in FIG. 7, the height of the cutter 4 is adjusted so that the tip 4c penetrates through the workpiece 6 placed on the holding sheet 10 but does not reach the upper surface of the plate 3b of the platen 3 when the cutter holder 5 is moved to the lowered position. When the cutter holder 5 is moved to the raised position as shown in FIG. 4, the tip 4c is also moved upward away from the workpiece 6.

Referring to FIGS. 3 to 5, the mount member 52 has 3 guide holes formed at constant spacing on the lower peripheral edge of the sleeve 52a. Among the 3 guide holes, the forward left guide hole is referred to as a guide hole 52b as shown in FIGS. 3 and 5 and the reward guide hole is referred to as a guide hole 52d as shown in FIG. 4. Below the sleeve 52a, a presser member 56 is disposed that has 3 guide bars. The underside of the presser member 56 serves a presser body 56a formed into a shallow bowl or a circular bowl which curves gradually. On the upper peripheral edge the presser body 56a, the guide bars are provided at constant spacing so as to be structurally integral with it. The 3 guide bars inserted into the 3 guide holes respectively. The guide bar inserted into the guide hole 52b is referred to as a guide bar 56b as shown in FIGS. 3 and 5, whereas the guide bar inserted into the guide hole 52d is referred to as the guide bar 56d as shown in FIG. 4. The presser member 56 is allowed to move up and down by the guidance provided by the guide bars being inserted into the corresponding guide holes of the mount member 52.

As shown in FIG. 4, at the center of the presser body 56a, a through hole 56e extends downward so as to allow the downward protrusion of the blade 4a of the cutter 4. The lower end surface of the presser body 56a serves as a contact portion 56f surrounding the blade 4a and contacting the workpiece 6. The contact portion 56f is shaped annularly and has a horizontal surface that establishes a surface contact with the workpiece 6. The contact portion 56f comprises a fluoride resin such as Teflon (a registered trademark) having a relatively low friction coefficient and thus, prone to slip with respect to the workpiece 6.

As can be seen in FIGS. 3 to 5, a connecting portion 56g, being structurally integral with the presser body 56a, extends forward from the upper peripheral edge of the presser body 56a. Above the connecting portion 56g, a front side mount 52e, being structurally integral with the mount member 52, is provided so as to be located in front of the sleeve 52a for the mounting of a solenoid 57. The solenoid 57 is an actuator for depressing the workpiece 6 by moving the presser member 56 up and down. The solenoid 57 is mounted on the front side mount 52e so as to be oriented downward and is provided with a plunger 57a whose tip is secured to the upper surface of the connecting portion 56g. As shown in FIG. 5, when the solenoid 57 is activated with the cutter holder 5 in the lowered position, the presser member 56 is lowered with the plunger 57a to depress the workpiece 6 with a predetermined pressure. In contrast, when the solenoid 57 is inactivated, the plunger 57a is located in the upper position and the presser member 56 releases the pressure applied to the workpiece 6. When the cutter holder 5 is moved to the raised position with the solenoid 57 inactivated, the presser member 56 is completely separated away from the workpiece 6 as indicated by double-dot chain line in FIG. 4.

Referring now to FIG. 2, the image reading apparatus 1 is provided with a scanner 59 for reading the image (s) on the holding sheet 10. The scanner 59 may comprise a CIS (contact image sensor). The scanner 59 is elongated in the left and right direction also referred to as the X direction and is provided with a read head, or more generally, a reading portion for image reading. Though not shown in detail, the scanner 59 comprises components such as a line sensor configured by multiple imaging devices aligned in the X direction, a light source, and a lens. The scanner 59 is located behind the guide frame 21 and extends in the left and right direction or the X direction so as to be substantially equal in length to the width of holding sheet 10. The scanner 59 is provided with a contact glass located on the surface of the read head located on its underside. The scanner 59 reads the images on the sheet material placed on the platen 3 by positioning the read head in the proximity of the upper surface of the sheet material.

Figure 8:
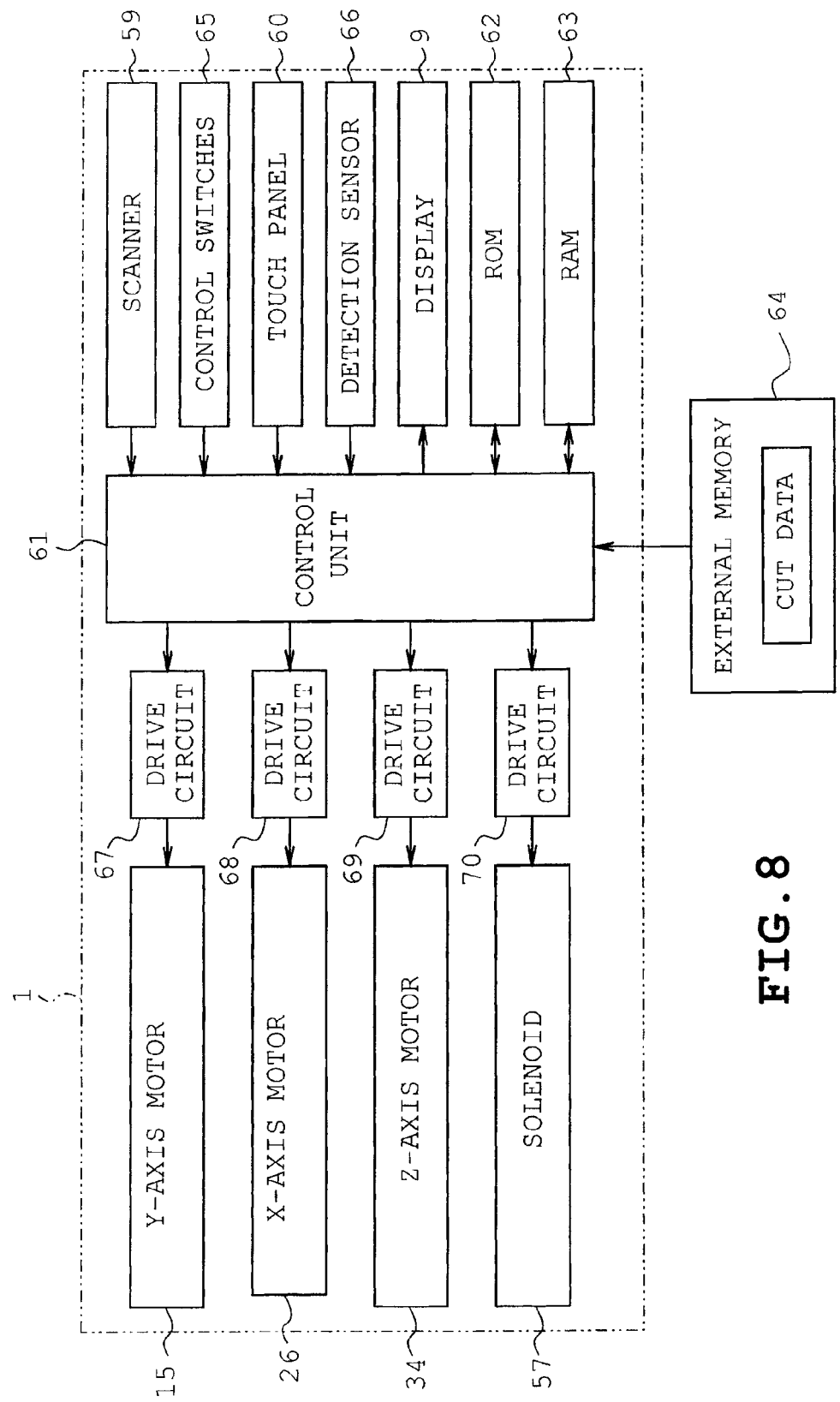
FIG. 8 is a block diagram schematically illustrating the electric configuration of the image reading apparatus.

The scanner 59 is controlled by a later described control unit 61 shown in FIG. 8. The control unit 61 feeds the sheet material to be scanned in the Y direction toward the rear side of the platen 3 by the feed mechanism 7. The X-directional scanning or reading by the scanner 59 is repeated in synchronism with the feeding to obtain a 2-dimensional image data. On the underside of the carriage 19, a detection sensor 66 shown in FIG. 8 is provided that detects the location of the tip, in other words, the Y directional location of the sheet member set to the sheet inlet 2a. The detection signal outputted from the detection sensor 66 is inputted to the control unit 61.

The control unit 61 extracts information such as the outline and color by processing the read image data with known image processing methods. For instance, in the normal mode, tasks such as detection of the outline, in other words, the location and the size of the workpiece 6 held by the holding sheet 10 and generation of cut data is carried out by reading the original image which the cut data is based. In the later described cleaning mode, a cleaning operation is performed to clean the read head of the scanner 59 using the cleaning sheet 71.

Next, a control system of the image reading apparatus 1 will be described with reference to FIG. 8. The control unit 61 responsible for the overall control of the image reading apparatus 1 is primarily configured by a computer (CPU) and is coupled to a ROM 62, RAM 63, and external memory 64. ROM 62 stores computer programs such as a cut control program for controlling the cut operation, a display control program for controlling the image output through display 9, and a control program for controlling the later described cleaning operation. The RAM 63 is a temporary storage for storing data and programs required in executing various processes.

The control unit 61 receives inputs of signals such as control signals from various control switches 65 and signals from the detection sensor 66 and the scanner 59. The control unit 61 is further connected to the display 9 and the touch panel 60. The display 9 outputs various items such as a pattern selection screen and a layout selection screen. The user may select a desired pattern or specify where to make the cuts through the operation of various control switches 65 or the touch panel 60, while viewing the display 9. The switching between the normal mode and the cleaning mode is also done through the control of the touch panel 60. Further, the display 9 shows the progress of the cleaning operation as will be later described. The control unit 61 is further connected to drive circuits 67, 68, 69, and 70 for driving the Y-axis motor 15, the X-axis motor 26, the Z-axis motor 34, and the solenoid 57. The control unit 61 controls the Y-axis motor 15, the X-axis motor 26, the Z-axis motor 34, and the solenoid 57 through the execution of the cut control program to automatically execute the cutting of the workpiece 6 located on the holding sheet 10.

The external memory 64 stores cut data for cutting multiple types of patterns with the cutting apparatus 1'. The cut data includes basic size information, cut line data, and display data. The basic size information represents the longitudinal and latitudinal sizes of the pattern and is a shape data corresponding to the shape of the pattern. The cut line data comprises coordinate data indicating the vertexes of line segments of the cut line data in X-Y coordinate system which is defined by the cutting apparatus 1'.

The control unit 61, when cutting out a pattern from the workpiece 6, feeds the holding sheet 10 and consequently the workpiece 6 in the Y direction by the feed mechanism 7 based on the cut data, in other words, the cut line data of a given pattern. By moving the cutter holder 5, in other words, the cutter 4 in the X direction by the cutter transfer mechanism 8 in synchronism with the feed movement, the workpiece 6 is cut along the outline of the pattern.

When the contact glass of the read head of the scanner 59 is contaminated by some reason, a black substantially straight line was typically observed in the captured image which degraded the quality of the captured image. In such case, the user was required to remove the contamination by cleaning the read head. However, the scanner 59 is disposed in a position which is not readily accessible by the user's hands and thus, is troublesome for the user to clean the same. In the first embodiment, the image reading apparatus 1 provides the cleaning sheet 71 as an accessory for cleaning the read head of the scanner 59 as shown in FIGS. 9 and 13C.

Figure 9:
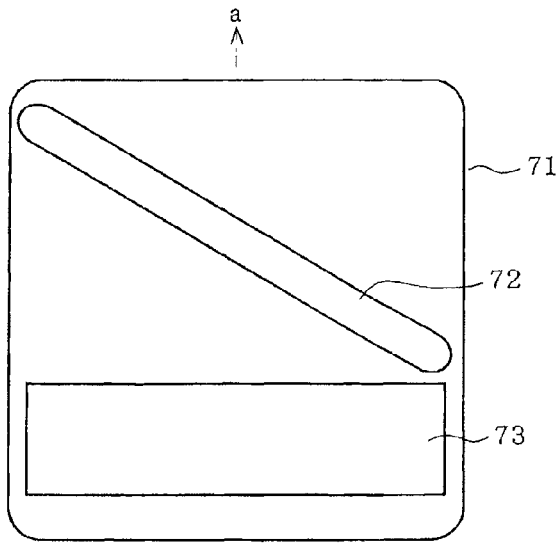
FIG. 9 is a plan view of the cleaning sheet.

Referring to FIG. 9, the cleaning sheet 71 of the first embodiment comprises a thin and flat rectangular plate made of plastic which is slightly elongated in the forward and reward direction. The cleaning sheet 71 is a single sheet provided with a cleaning portion 72, and a contamination reference portion 73 serving as a reference portion. The cleaning sheet 71 is inserted into the image reading apparatus 1 in the direction of arrow a through the sheet inlet 2a and fed in the Y direction, in other words, the forward and rearward direction over the platen 3 by the feed mechanism 7. As indicated in FIG. 13C, the cleaning sheet 71 is also assigned an X-Y coordinate system in which the origin O is located on the rear left corner as was the case in the holding sheet 10.

The contamination reference portion 73 comprises a white and laterally elongate rectangular area which is elongated in the X direction along the proximal front side of the cleaning sheet 71. The cleaning portion 72 extends obliquely across a rectangular region of the cleaning sheet 71 exclusive of the contamination reference portion 73. More specifically, the cleaning portion 72 extends like a belt along one of the diagonal lines as indicated by straight line L in FIG. 13C. The cleaning portion 72 is made by dense implantation of relatively soft short fiber. In other words, the cleaning portion 72 is formed as a brush capable of wiping off the contamination of the read head. The cleaning portion 72 runs across the cleaning sheet 71 so as to come closer to the proximal front side of the cleaning sheet 71 as it progresses rightward from the distal left corner. Stated differently, the cleaning portion 72 is formed like a belt that extends in a direction intersecting with both the X direction in which the read head of the scanner 59 extends and the Y direction in which the feed mechanism 7 is moved.

As later described through the flowchart, the control unit 61 executes the cleaning operation by software configuration, in other words, the execution of the cleaning operation control program. In operation, the user is to switch the mode setting from the normal mode to the cleaning mode through the control of the touch panel 60. Then, the cleaning sheet 71 is set/inserted whereafter the cleaning operation is started in response to the user instruction through the touch panel 60 operation. The control unit 61 begins the cleaning operation by evaluating the level of contamination of the read head based on the read data pertaining to the image of the contamination reference portion 73 read by the scanner 59. Then, the control unit 61 proceeds to control the cleaning operation carried out by the cleaning portion 72 based on the result of evaluation.

One of the features of the first embodiment is that the evaluation of the contamination of the read head is carried out by identifying the range or the position of contamination in the X direction which is the direction in which the read head extends. Then, in order to allow the cleaning portion 72 to clean the identified contamination range or position, the control unit 61 calculates the range of Y-directional feeding of the cleaning sheet 71 in other words, the range of reciprocating movement. The control unit 61 controls the Y-axis motor 15 of the feed mechanism 7 based on the calculated transfer range and executes the cleaning of the read head. Thus, the control unit 61 can also be described as serving as an evaluation unit, an identification unit, and a calculation unit. Further in the first embodiment, the control unit 61 reports the progress of the cleaning mode through the display 9 as exemplified in FIGS. 11A to 11D. Thus, the control unit 61 as well as the display 9 also serves as a reporting unit.

Figure 10:
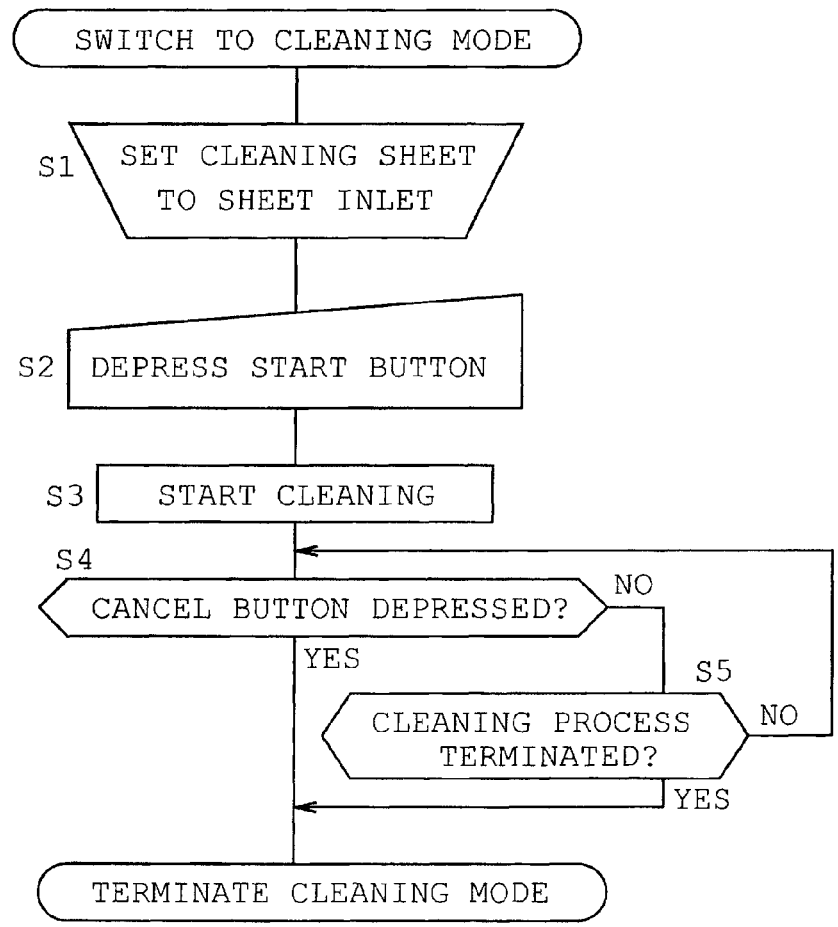
FIG. 10 is a flowchart indicating the general process flow of a cleaning mode executed by a control unit.
Figure 11A:
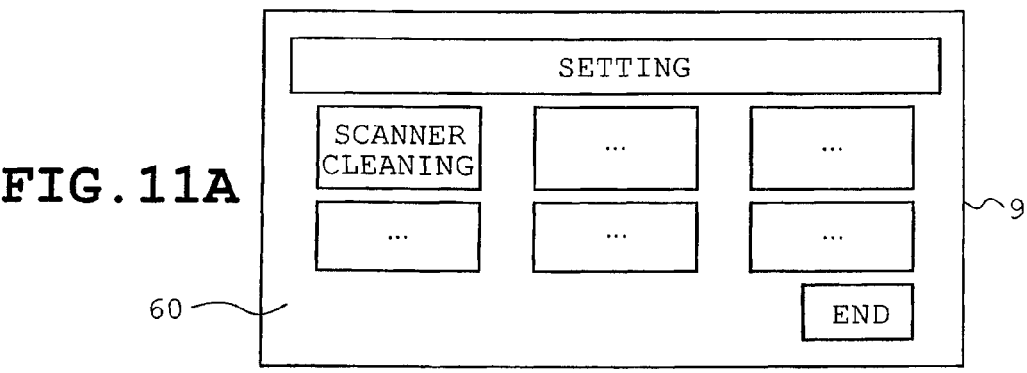
FIG. 11A illustrates a mode setting screen outputted on a display.

Next, a description will be given on the operation of the above described structure and configuration with reference to FIGS. 10 to 13C. The flowchart indicated in FIG. 10 schematically describes the process flow when the mode switching is made from the normal mode to the cleaning mode. FIGS. 11A to 11D indicate the corresponding screen transition within the display 9. The user is to prepare a cleaning sheet 71 if the user wishes to clean the read head of the scanner 59. Then, a setting screen, that is, the mode selection screen is outputted to display 9 as shown in FIG. 11A, in which response, the user touches the "scanner cleaning" icon on the touch panel 60.

Figure 11B:
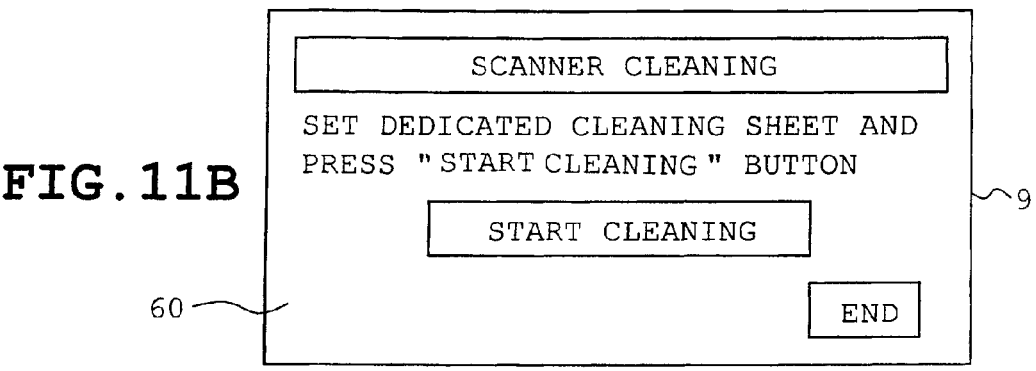
FIG. 11B illustrates a screen outputted on the display when a mode switching is made to the cleaning mode.

Then, a mode switching is made to the cleaning mode and messages are presented through the screen outputted to the display 9 notifying the user that a mode switching has been made to the cleaning mode and prompting the user to set the cleaning sheet 71 as shown in FIG. 11B. An icon labeled "START CLEANING", in other words, the start button is further outputted on the display 9. As indicating in more detail in FIG. 10, when the cleaning mode has been started, the user is to first set the cleaning sheet 71 to the sheet inlet 2 at step S1. Then, at step S2, the user is to touch the "START CLEANING" icon on the touch panel 60. Responsively, the cleaning operation is started at step S3. The cleaning operation will be later described in detail based on the flowchart of FIG. 12.

Figure 11C:
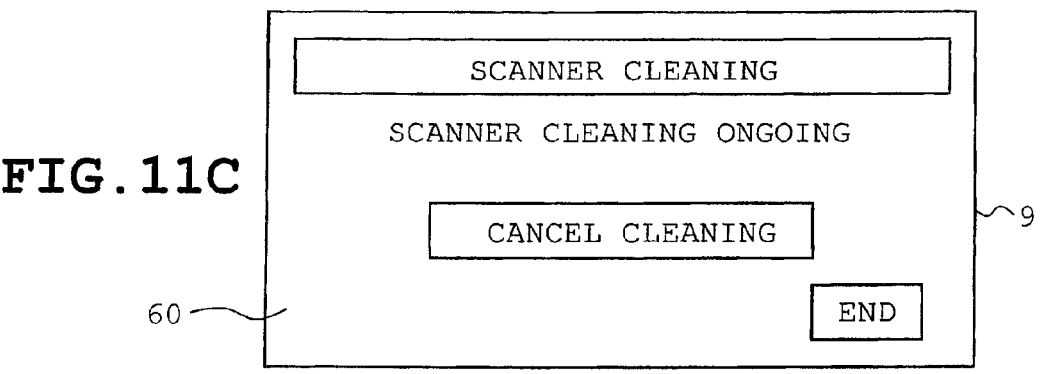
FIG. 11C illustrates a screen outputted on the display when a cleaning operation is ongoing.
Figure 11D:
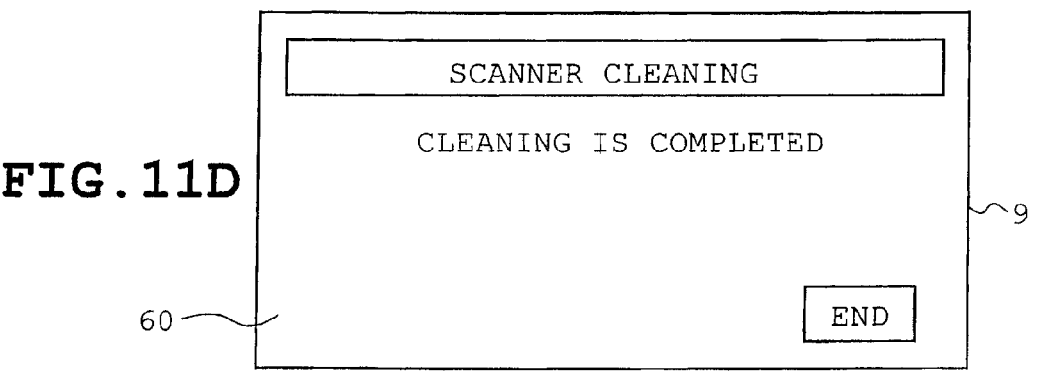
FIG. 11D illustrates a screen outputted on the display when the cleaning operation is terminated.

When the cleaning operation has been started, the screen outputted on the display 9 shows a message reporting to the user that the cleaning operation is ongoing as shown in FIG. 11C. At the same time, an icon labeled "CANCEL CLEANING" is also shown. If the user wishes to cancel or prematurely stop the cleaning operation, the user is to touch the "CANCEL CLEANING" icon, in other words, the Cancel button on the touch panel 60. Referring back to FIG. 10, at step S4, whether or not the cancel button has been depressed is monitored and at step S5, whether or not the cleaning operation has been completed is monitored. The cleaning mode is terminated when the stop button has been depressed (step S4: Yes), or when the cleaning operation has been completed (step S5: Yes). When the cleaning mode is terminated a message reporting the termination of the cleaning is outputted as shown in FIG. 11D.

Figure 12:
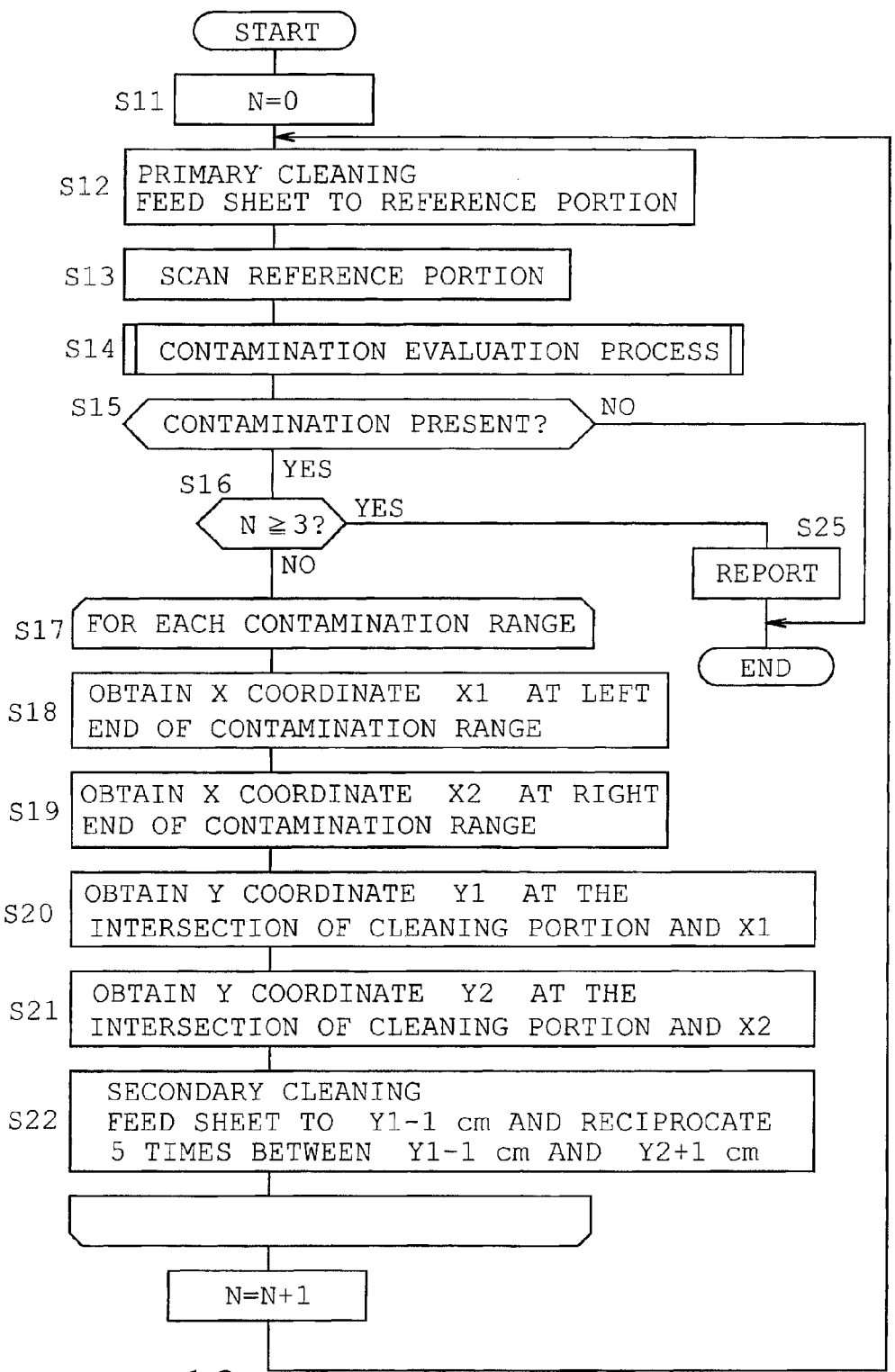
FIG. 12 is a flowchart indicating the steps of the cleaning operation executed by the control unit.

The flowchart of FIG. 12 indicates the steps of the cleaning operation in detail. The following description is based on an example in which 2 contamination ranges are found on the read head of the scanner 59 as exemplified in FIG. 13A. As the cleaning operation is started in FIG. 12, variable N indicating the execution count of the cleaning operation is initialized to 0 at step S11. Then, at step S12, the cleaning sheet 71 set to the sheet inlet 2a is fed by the feed mechanism 7 in the Y direction indicated by arrow a and stopped at the position in which the contamination reference portion 73 is read by the scanner 59. At this instance, the cleaning portion 72, lying ahead of the contamination reference portion 73 in the feed direction within the cleaning sheet 71, wipes the read head of the scanner 59 once. This is referred to as a primary cleaning.

Then, at step S13, the reading, in other words, the scanning of the contamination reference portion 73 by the scanner 59 is executed. Next, at step S14, based on the data read by the scanner 59, the level of contamination of the read head is evaluated, which, in this case, is the identification of the contamination range or the contamination position in the X direction. The contamination evaluation is based upon the comparison between a white level value and a black level value. The white level value is obtained by reading the image of a completely white contamination reference portion 73, whereas the black level value is obtained by reading the tainted contamination reference portion 73 when there is contamination on the read head.

Contamination evaluation can be realized through known methods. For instance, the image data read by the scanner 59 may be subjected to gray-scale image processing in which the image data may be assigned a pixel value ranging between multiple gray levels, e.g. 256 gray levels for each pixel aligned in the X direction. Then, each of the pixels is categorized into the white level area or the black level area based on a predetermined threshold value and the black level area is considered as the contaminated range. In the example of FIG. 13A, when there is contamination in 2 different locations, one in the central left portion and one in the central right portion, of the read head of the scanner 59, the gray-scale level of the X-directionally aligned pixels follow the curve indicated in FIG. 13B. Categorization based on the threshold value identifies 2 ranges in the central left portion and the central right portion which are numbered as the first contamination range and the second contamination range. In FIG. 13A, the first contamination range is represented as CR1 whereas the second contamination range is represented as CR2.

Referring back to FIG. 12, at step S15, judgment is made on the presence or absence of contamination. If no contamination is identified, in other words, sufficient cleaning was achieved by the primary cleaning (step S15: No), the process is terminated. If contamination is present or remaining (step S15: YES), the process proceeds to step S16 and judgment is made as to whether or not variable N is equal to or greater than 3. If the contamination cannot be removed even after the third repetition of the later described cleaning operation referred to as the secondary cleaning (step S16: Yes), a judgment is made that the level of contamination is too severe to be cleaned by the cleaning sheet 71. In such case, the cleaning operation is no longer repeated.

In case variable N is less than 3 (step S16: No), secondary cleaning which is the cleaning operation for each contamination range is executed from the start of the loop in the following step S17 to the end of loop at step S23. The secondary cleaning is executed one by one for each contamination range in the order of the contamination range number assigned. A variable representing the contamination range number is incremented from 1 to the total count of the contamination range as the cleaning progresses. Taking the example of FIG. 13A, the secondary cleaning is started from the first contamination range CR1 in the left side. At step S18, the X coordinate X1 on the left side of the contamination range CR1 is obtained whereafter at step S19, the X coordinate X2 on the right side of the contamination range CR1 is obtained. Then, at step S20, the Y coordinate Y1 at the intersection of the cleaning portion 72 and the coordinate X1 is obtained, whereafter at step S21, the Y coordinate Y2 at the intersection of the cleaning portion 72 and the coordinate X2 is obtained.

In the contamination exemplified in FIG. 13A, coordinate Y1 is plotted at the intersection of coordinate X1 and straight line L passing through the central line of the cleaning portion 72, whereas coordinate Y2 is plotted at the intersection of coordinate X2 and straight line L passing through the central line of the cleaning portion 72. Then, at the following step S22, the range of Y-directional reciprocating movement of the cleaning sheet 71 for cleaning the first contamination range CR1 is specified, in other words, calculated to range from (Y1−1 cm) position to (Y2+1 cm) position. Then, the feed mechanism 7 is controlled to repeat the reciprocating movement for 5 times for example to execute the cleaning of the read head by the cleaning portion 72 of the cleaning sheet 71, which is also referred to as the secondary cleaning. The calculated range of secondary cleaning from (Y1−1 cm) position to (Y2+1 cm) position is represented as secondary cleaning range CLR in FIG. 13A. As described above, based on the X directional position which is taken in the direction in which the read head extends, a uniquely corresponding Y-directional position can be obtained which indicates the position to be cleaned by the cleaning portion 72. Thus, Y direction position to which the cleaning sheet 71 is to be fed for focused cleaning of the targeted contamination range can be calculated.

Upon completion of the secondary cleaning configured to go through 5 reciprocations, the loop is ended at step S23. The steps from step S17 are repeated for the count of existing contamination ranges. In the example shown in FIG. 13A, similar steps, that is, the secondary cleaning is executed for the second contamination range CR2. Upon completion of the secondary cleaning for every contamination range, the process proceeds to step S24 in which variable N is incremented by 1 and steps from step S12 is repeated. Thus, as long as there is a remaining contamination, the secondary cleaning is repeated for maximum of 3 times. If contamination remains even after the third secondary cleaning (step S16: Yes), the process proceeds to step S25 in which a report is made to the user informing that the contamination could not be removed by the cleaning operation, and the process is terminated.

According to the first embodiment, the cleaning sheet 71 is provided that includes the cleaning portion 72 and the contamination reference portion 73 within a single sheet. The read head of the scanner 59 was configured to be cleaned by the cleaning portion 72 by feeding the cleaning sheet 71 by the feed mechanism 7. The cleaning operation is controlled based on the level of contamination which was evaluated based on the read data acquired in advance by reading the image of the contamination reference portion 73 of the cleaning sheet 71 by the scanner 59. The above described configuration provides an outstanding advantage of cleaning the read head of the scanner 59 with excellent efficiency through the use of the cleaning sheet 71.

One of the advantageous features of the first embodiment is the provision of the cleaning portion 72 extending like a belt in the direction intersecting with both the X direction in which the read head of the scanner 59 extends as well as the Y direction in which the cleaning sheet 71 is fed. The cleaning operation is executed by identifying the contamination range or the contamination position in the direction in which the read head extends, and calculating the range of feeding of the cleaning sheet 71 so that the identified contamination range or the contamination position is cleaned by cleaning portion 72. Thus, the identified contamination range or the contamination position can be cleaned with excellent efficiency by the cleaning portion 72 while simplifying the control of such process.

Another advantageous feature of the first embodiment is the reporting of the progress of the cleaning operation through the display 9. The reporting allows the user to be readily aware of the progress of the cleaning operation. Further, mode switching between the normal mode in which images on the surface of the holding sheet 10 is read by the scanner 59 and the cleaning mode in which the read head is cleaned by the cleaning sheet 71 is enabled through the operation of the touch panel 60. The user is allowed to readily execute cleaning operation through the mode switching control.

In the cleaning sheet 71 of the first embodiment, the cleaning portion 72 for cleaning the read head of the scanner 59 and the contamination reference portion 73 used for evaluating the level of contamination of the read head are provided in a single sheet. Thus, 2 functionalities can be accomplished efficiently in a single sheet while being suitable in cleaning the read head of the scanner 59 of the above described image reading apparatus 1. Further, providing a diagonally extending belt like cleaning portion 72 also allows more efficient cleaning of the contamination range or the contamination position of the read head while simplifying the control for the same. Further, the cleaning portion 72 is provided in the shape of a belt and thus, facilitates the cleaning operation.

(2) Second Embodiment and Other Embodiments

Figure 14:
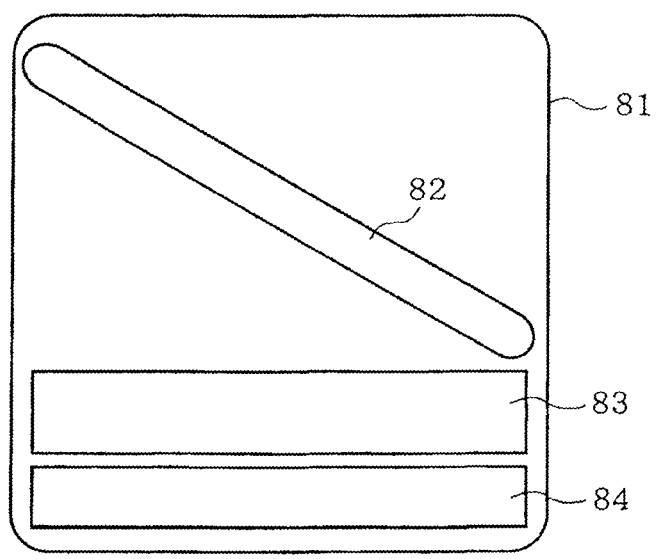
FIG. 14 illustrates a second embodiment and is a plan view of the cleaning sheet.
Figure 15:
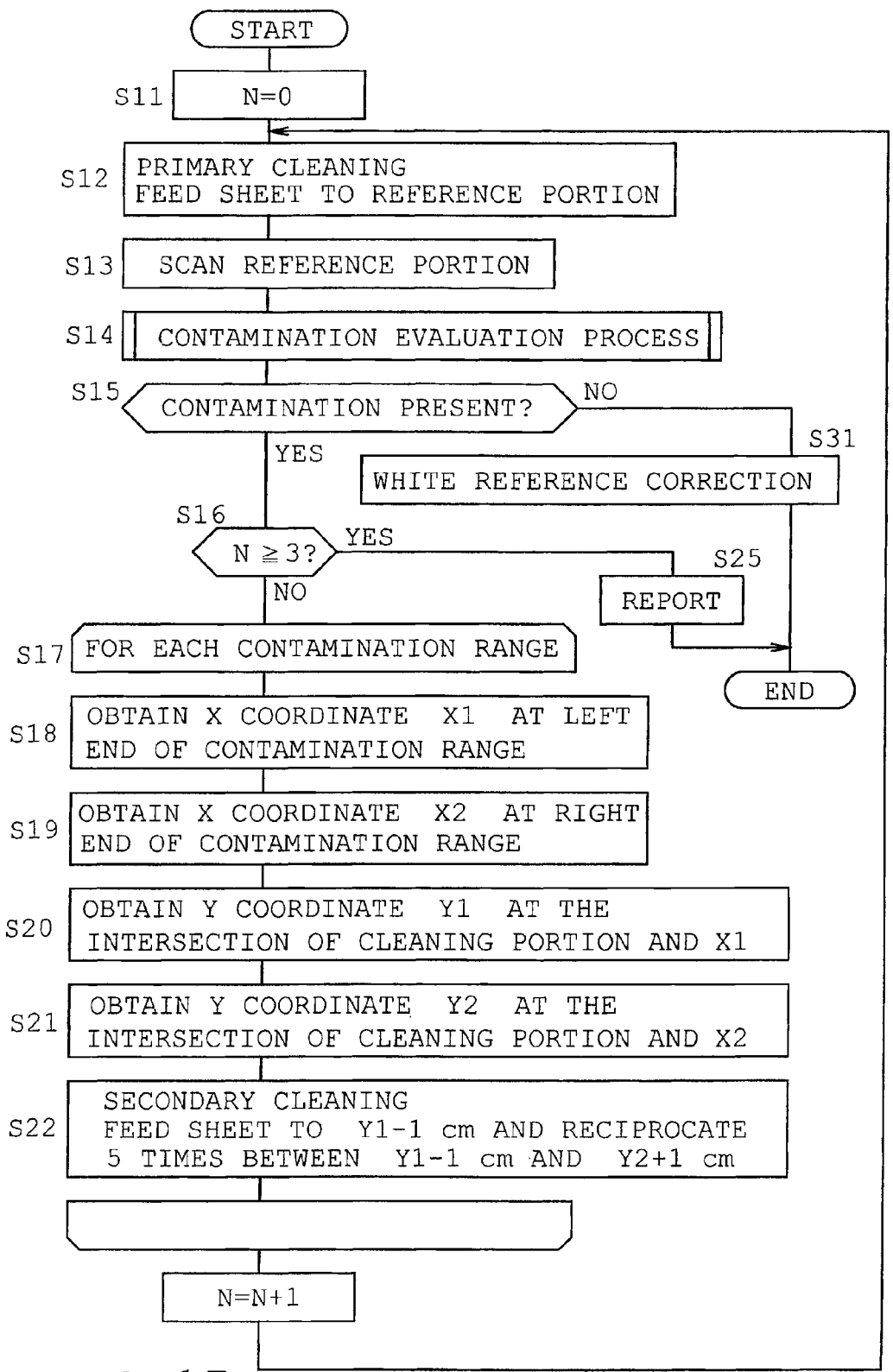
FIG. 15 is a flowchart indicating the general process flow of the cleaning mode executed by the control unit.

FIGS. 14 and 15 illustrate a second embodiment. The second embodiment differs from the first embodiment in the configuration of the cleaning sheet, represented in the second embodiment as a cleaning sheet 81, and the control of the cleaning operation. Only the differences from the first embodiment will be described hereinafter.

FIG. 14 illustrates the cleaning sheet 81 of the second embodiment. The cleaning sheet 81 is a thin and flat rectangular plate made of plastic as was the case in the cleaning sheet 71 of the first embodiment. The cleaning sheet 81 is a single sheet provided with a cleaning portion 82, a contamination reference portion 83, and a white reference correction portion 84 which is used by the scanner 59 for white reference correction of the images read by the scanner 59. The white reference correction portion 84 is colored entirely white and is located in front of the contamination reference portion 83. The white reference correction portion 84 is arranged as a laterally elongate rectangular area extending along the proximal side of the cleaning sheet 81 as viewed in FIG. 14. The cleaning portion 82 and the contamination reference portion 83 are identical in configuration to those of the cleaning sheet 71.

As indicated in the flowchart of FIG. 15, using the above described cleaning sheet 81, the control unit 61 executes the cleaning operation of steps S11 to S25 similar to the cleaning operation executed in the first embodiment. At step S15, if no contamination was detected, meaning that sufficient cleaning has been executed (step S15: No), a known white reference correction process is executed using the white reference correction portion 84 at step S31. Thus, the second embodiment not only achieves the effects of the first embodiment but also achieves further advantage of enabling a white reference correction process, in other words, correcting the image data read by the scanner 59 through the use of the white reference correction portion 84 at step S31.

In the foregoing embodiments, the image processing apparatus 1 was configured to include the cutting apparatus 1'. The present disclosure may, however, be applied to image reading apparatuses in general such as a copier, facsimile, and image scanner. Further, the cleaning sheets 71 and 81 made by a plastic sheet in the foregoing embodiments may be made of thick sheet of paper or metal plate. The cleaning portions 72 and 82 made of brush may be made by materials such as a felt, a sponge, a rubber, and a cloth. The shape of the cleaning portion may be modified as required. The cleaning portion may be soaked with chemicals such as detergents and solvents in executing the cleaning operation.

The present disclosure is not limited to the foregoing embodiment but may be modified as required such as the details of the cleaning operation. For instance, the count of reciprocations in a single cleaning; the count of repetition of the secondary cleaning, in other words, the threshold value to be assigned to variable N may be modified. Further, the primary cleaning may be eliminated depending upon the layout of the cleaning portion and the contamination reference portion within the cleaning sheet. Still further, the progress reporting of the cleaning mode may be modified, for instance by eliminating the reporting feature.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

What is claimed is:

1. An image reading apparatus comprising:
    a feed mechanism configured to feed a sheet member;
    a scanner including a reading portion and being configured to read an image on a surface of the sheet member in synchronism with the feeding of the sheet member by the feed mechanism;
    a cleaning sheet comprising a single sheet including a cleaning portion configured to clean the reading portion of the scanner, and a reference portion configured to be used in evaluating contamination of the reading portion, the cleaning portion being formed into a belt-like shape extending in a first direction intersecting with both a second direction in which the reading portion extends and a third direction in which the feed mechanism feeds the sheet material;
    an evaluator configured to evaluate the contamination of the reading portion based on read data pertaining to an image of the reference portion of the cleaning sheet read by the scanner, the evaluator including an identifier configured to identify a range of contamination or a position of contamination residing in the second direction;
    a calculator configured to calculate a feed range of the cleaning sheet in the third direction so that the cleaning portion cleans the reading portion based on the range of contamination or the position of contamination identified by the identifier; and
    a controller configured to control the feed mechanism to execute a cleaning operation in which the cleaning sheet is fed so that the cleaning portion cleans the reading portion based on the evaluation of the evaluator and the feed range calculated by the calculator.

2. The apparatus according to claim 1, further comprising a reporter configured to report progress of the cleaning operation.

3. The apparatus according to claim 1, further comprising a switch controller configured to effect a switch between a normal mode in which the image on the surface of the sheet member is read by the scanner while the sheet member is fed by the feed mechanism and a cleaning mode in which the cleaning operation is executed using, the cleaning sheet.

4. The apparatus according to claim 1, wherein the cleaning operation includes a primary cleaning in which the entire reading portion is cleaned once by the cleaning portion of the cleaning sheet, and a secondary cleaning executed after the primary cleaning in which the reading portion is cleaned by the cleaning portion of the cleaning sheet based on the evaluation of the evaluator.

5. The apparatus according to claim 1, wherein the cleaning sheet further includes a white reference correction portion configured to provide a white reference, and
wherein the controller is configured to execute a white reference correction of image data read by the scanner based on the white reference correction portion read by the scanner.

* * * * *